(12) United States Patent
Hedtke et al.

(10) Patent No.: US 7,808,379 B2
(45) Date of Patent: Oct. 5, 2010

(54) MODE SELECTABLE FIELD TRANSMITTER

(75) Inventors: Robert C. Hedtke, Young America, MN (US); John Paul Schulte, Eden Prairie, MN (US); Steven Richard Trimble, Prior Lake, MN (US)

(73) Assignee: Rosemount Inc., Eden Prairie, MN (US)

( * ) Notice: Subject to any disclaimer, the term of this patent is extended or adjusted under 35 U.S.C. 154(b) by 669 days.

(21) Appl. No.: 11/714,639

(22) Filed: Mar. 5, 2007

(65) Prior Publication Data
US 2008/0218333 A1 Sep. 11, 2008

(51) Int. Cl.
*G08B 1/08* (2006.01)
(52) U.S. Cl. .................. 340/539.26; 340/611; 340/614; 340/618; 340/626; 702/89
(58) Field of Classification Search ............ 340/539.26, 340/533, 534, 538, 592, 635, 664, 870.03, 340/611, 614, 618, 626, 870.17; 370/320, 370/335, 352, 466, 225, 310; 375/140, 142, 375/206, 208; 702/89, 107
See application file for complete search history.

(56) References Cited

U.S. PATENT DOCUMENTS

| | | | | |
|---|---|---|---|---|
| 4,200,933 A | * | 4/1980 | Nickel et al. .................. 702/88 |
| 5,420,578 A | * | 5/1995 | O'Brien et al. ........ 340/870.13 |
| 5,642,301 A | * | 6/1997 | Warrior et al. ............... 702/104 |
| 5,899,962 A | * | 5/1999 | Louwagie et al. ........... 702/138 |
| 5,999,561 A | | 12/1999 | Naden et al. |
| 6,298,218 B1 | | 10/2001 | Lowe et al. |
| 6,327,311 B1 | | 12/2001 | Ojard |
| 6,568,279 B2 | | 5/2003 | Behm et al. |
| 6,639,939 B1 | * | 10/2003 | Naden et al. ................. 375/140 |
| 6,935,156 B2 | * | 8/2005 | Broden et al. ................. 73/1.57 |
| 6,980,106 B2 | * | 12/2005 | Sutphin ................. 340/539.26 |
| 7,035,285 B2 | | 4/2006 | Holloway et al. |
| 7,050,419 B2 | * | 5/2006 | Azenkot et al. ............. 370/347 |
| 7,164,355 B2 | * | 1/2007 | Schnaare et al. ....... 340/539.26 |
| 7,280,048 B2 | * | 10/2007 | Longsdorf et al. .......... 340/664 |
| 2002/0006137 A1 | | 1/2002 | Rabenko et al. |
| 2005/0221765 A1 | * | 10/2005 | Shen et al. ..................... 455/73 |
| 2005/0258959 A1 | | 11/2005 | Schnaare et al. |

\* cited by examiner

*Primary Examiner*—Hung T. Nguyen
(74) *Attorney, Agent, or Firm*—Kinney & Lange, P.A.

(57) ABSTRACT

A selectable mode field transmitter is configurable to operate in one of a plurality of operating modes having different combinations of function, performance, and power consumption. The selectable mode field transmitter includes a housing, a sensor located within the housing, and transmitter circuitry for transmitting data provided by the sensor to a receiver external to the housing. The transmitter circuitry includes a controller that electrically configures the transmitter circuitry to one of a plurality of operational modes in response to mode selection data received from a source external to the housing. Therefore, the selectable mode field transmitter can be configured based on the needs or requirements of a particular application.

30 Claims, 3 Drawing Sheets

MODE SELECTABLE FIELD TRANSMITTER

BACKGROUND OF THE INVENTION

The present invention relates to field transmitters used for process control. In particular, the invention relates to field transmitters having selectable modes of operation.

Processing plants, such as chemical, petroleum, gas, and pharmaceutical plants require careful control and monitoring of a variety of process variables. Examples of process variables include pressure, temperature, flow, conductivity, and pH. To monitor process variables located throughout a processing plant, devices known as field transmitters have been developed. A field transmitter includes a transducer that responds to a measured process variable with a sensing element and converts the variable to a standardized transmission signal (e.g., an electrical or optical signal) that is a function of the measured process variable.

Depending on the application, a large number of transmitters may be required to monitor process variables throughout a processing plant. In addition, the application or functionality required of each transmitter may be different, depending on the application. To meet each of the variety of applications and functionality, a manufacturer typically offers a variety of unique transmitters, each providing different functionality and performance.

BRIEF SUMMARY OF THE INVENTION

A selectable mode field transmitter is configurable to operate in one of a plurality of operating modes having different combinations of function, performance, and power consumption. The selectable mode field transmitter includes a housing, a sensor located within the housing, and transmitter circuitry for transmitting data provided by the sensor to a receiver external to the housing. The transmitter circuitry includes a controller that electrically configures the transmitter circuitry to one of a plurality of operational modes in response to mode selection data received from a source external to the housing.

DETAILED DESCRIPTION

This disclosure describes a mode selectable transmitter that provides a variety of selectable modes of operation. Each mode provides a different allocation of power or functionality within the mode selectable transmitter. For example, the mode selectable transmitter may have a universal mode that allocates power to provide good overall performance. The mode selectable transmitter may also have a fast response mode, in which power is allocated such that updates to a measured process variable are provided at a faster rate than the universal mode (at the expense of some other functionality of the transmitter). One of the benefits of a mode selectable transmitter is that a single transmitter may be used to meet a variety of unique applications.

Figure 1:
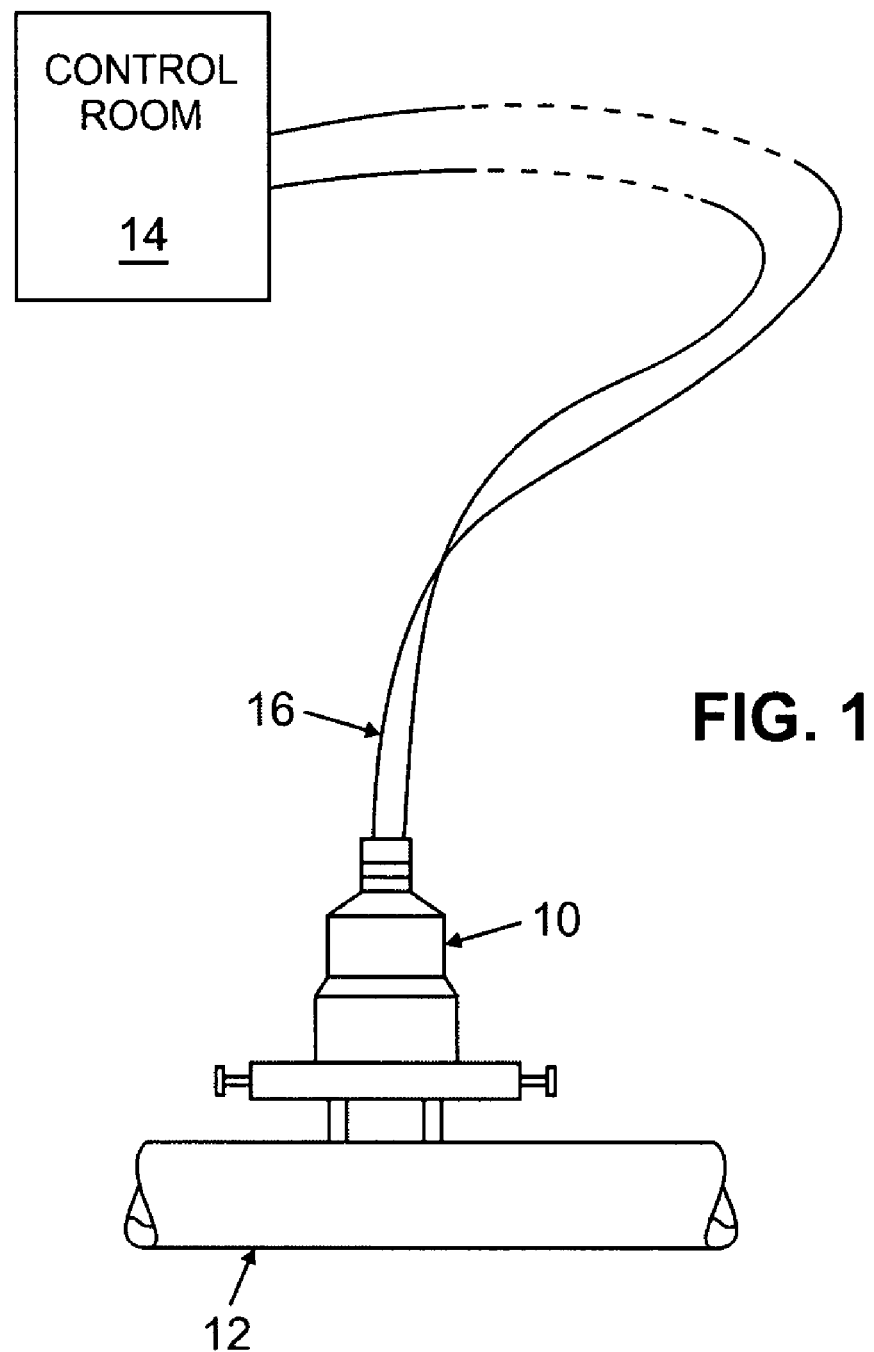
FIG. 1 is a perspective view of a mode selectable transmitter connected to provide sensed process data to a control room.

FIG. 1 is a diagram of a process measuring system, which includes mode selectable field transmitter 10, process pipe 12, and control room 14. Mode selectable field transmitter 10 is coupled to monitor a process variable (such as temperature, flow, or pressure) of a fluid or gas contained within pipe 12. In this embodiment, the monitored process variable is communicated to control room 14 via twisted wire pair 16, and control room 14 provides power to mode selectable field transmitter 10 via twisted wire pair 16.

In other embodiments, mode selectable field transmitter 10 is connected to control room 14 via a digital multi-drop network, which also provides power from control room 14 to mode selectable field transmitter 10. Examples of digital communication standards used in digital multi-drop networks include Foundation Fieldbus and Profibus. In yet another embodiment, mode selectable field transmitter 10 communicates wirelessly with control room 14. In this embodiment, mode selectable field transmitter 10 may be powered by a battery system. For purposes of this description, mode selectable field transmitter 10 is described in terms of a common embodiment, in which mode selectable field transmitter 10 is connected to control room 14 via twisted wire pair 16, although mode selectable transmitter 10 may be employed in a variety of architectures.

In this embodiment, mode selectable field transmitter 10 may communicate monitored process variables to control room 14 using analog or digital means of communication. Mode selectable field transmitter 10 communicates analog data to control room 14 by controlling the magnitude of the loop current (typically 4-20 mA) to reflect the value of the monitored process variable. The 4-20 mA range of loop current reserved for communicating sensed process variables to control room 14 means that all transmitter operations must function on less than 4 mA of current. Mode selectable field transmitter 10 provides a means for allocating the limited current (i.e., limited power) in order to tailor the performance of mode selectable field transmitter 10 to a particular application.

Figure 2:
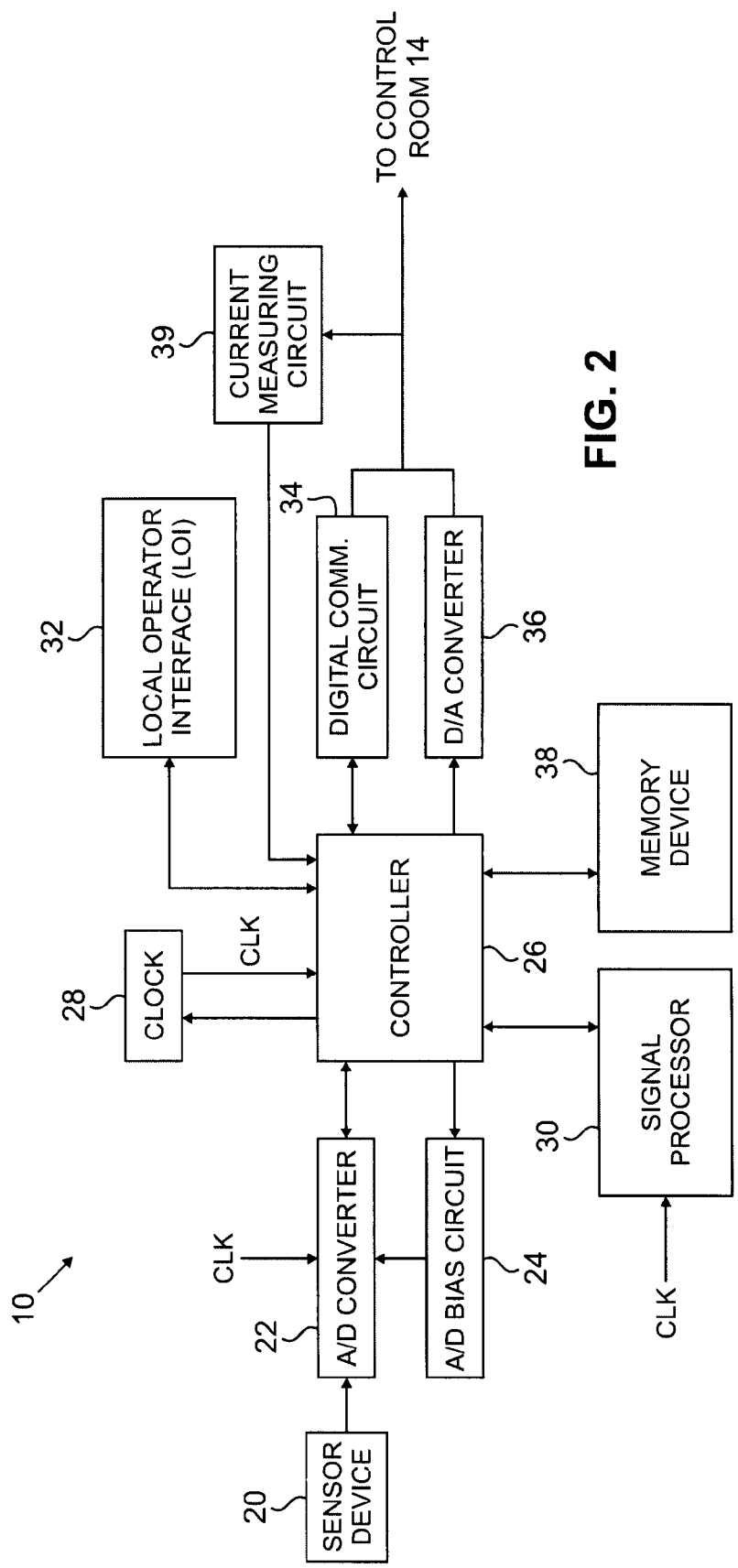
FIG. 2 is a simplified block diagram view of a mode selectable transmitter.

FIG. 2 is a simplified block diagram of one embodiment that illustrates components within mode selectable transmitter 10. Components include sensor 20, analog-to-digital (A/D) converter 22, A/D bias circuit 24, controller 26, clock 28, signal processor 30, local operator interface (LOI) 32, digital communication circuit 34, digital-to-analog (D/A) converter 36, memory device 38 and current measuring circuit 39. Controller 26 provides control signals to connected components to alter or modify the operation of the components. By selectively controlling the operation of each of the connected components, mode selectable field transmitter 10 can be controlled to operate in a number of different modes.

Sensor 20 is a transducer connected to monitor a process variable and provide an electrical signal representative of the monitored process variable. Sensor 20 provides the electrical signal to A/D converter 22, which converts the analog signal provided by sensor 20 to a digital signal that can be communicated to controller 26. A/D bias circuit 24 regulates the power provided to A/D converter 22. Controller 26 provides the digital signal representing the measured process variable to signal processor 30, which performs a series of mathematical operations on the digital signal. For instance, signal processor 30 may execute a signal compensation algorithm to modify the sensed processor variable to account for variances in sensor 20 caused by temperature changes or other factors.

Signal processor 30 provides a processed signal to controller 26, which communicates the processed signal to control room 14 using analog or digital means. For analog communication, the measured process variable (following processing by signal processor 30) is provided by controller 26 to digital-to-analog (D/A) converter 36, which modulates the loop current between 4-20 mA based on the measured process variable. For digital communication, controller 26 provides the processed signal (or other data such as diagnostic data) to digital communication circuit 34, which communicates the data to control room 14. Digital communication circuit 34 may also receive digital communications such as requests and instructions from control room 14.

In addition, controller 26 may provide data (such as the measured process variable) to LOI 32. In one embodiment, LOI 32 may include a simple display unit (such as an LCD output) that displays the measured process variable locally. In other embodiments, LOI 32 may include functionality that is more complex. For example, LOI 32 may include a display unit and a user interface that allows a user to provide requests and instructions locally to mode selectable field transmitter 10.

Modes of operation provided by mode selectable field transmitter 10 are selected by controlling or modifying the operation of components within the transmitter, such as A/D converter 22, A/D bias 24, clock 28, signal processor 30 and LOI 32. In the embodiment shown in FIG. 2, controller 26 provides mode selection instructions to the connected components in order to implement a desired mode of operation. Controlling the components may include selecting between two or more hardware configurations or controlling or modifying software executed by the components. That is, mode selection may be implemented through hardware or software configurations.

In general, the trade-off between higher performance and power allows some elements to be run in higher performance modes at the expense of other components. By selecting a particular mode of operation, mode selectable field transmitter 10 can be configured to meet the needs of a particular application.

As shown in FIG. 2, controller 26 provides mode selection instructions to A/D converter 22. Mode selection instructions provided to A/D converter 22 configure the update rate associated with A/D converter 22. The update rate is defined as the rate at which A/D converter 22 provides an electronic signal representing a measured process variable to controller 26.

There are several ways to affect the update rate of A/D converter 22. In one embodiment, a faster update rate is achieved by increasing the internal rate at which A/D converter 22 operates. The internal update rate may be controlled by controller 26 using hardware or software modifications to A/D converter 22. In addition, controller 26 may configure the internal update rate of A/D converter 22 by selectively increasing or decreasing the clock frequency generated by clock 28. Increasing the internal update rate associated with A/D converter 22 generally requires an increase in power consumption in order to preserve the accuracy of data provided by A/D converter 22. Increasing the power consumption of A/D converter is discussed below with respect to A/D bias circuit 24.

In another embodiment, the update rate of A/D converter 22 is increased without increasing the internal update rate of A/D converter 22. In this embodiment, A/D converter 22 is configured to provide updates using less internal data. The net result is increased update rates at the same or similar power consumption requirements, but with less overall accuracy in the data provided by A/D converter 22. Therefore, controller 26 may configure the update rate associated with A/D converter 22 in a variety of ways.

In addition to controlling the update rate of A/D converter 22, controller 26 may also configure the amount of time it takes A/D converter 22 to provide a first update following start-up of mode selectable transmitter 10. A/D converter 22 may be configured by controller 26 to operate at an increased internal rate or by reducing the data used to form the update (as described above). After the first update is provided, the update rate of A/D converter 22 may revert to a normal update rate.

In conjunction with mode selection instructions provided to A/D converter 22 to alter the update rates associated with A/D converter 22, controller 26 may also provide mode selection instructions to A/D bias circuit 24 to regulate the amount of power A/D converter 22 draws from a power supply (not shown). For example, if the internal rate of A/D converter 22 is increased while preserving the accuracy of A/D converter 22, then A/D converter 22 will typically require additional power consumption. In this scenario, controller 26 configures A/D bias circuit 24 increases the amount of power A/D converter 22 draws from the power supply. If A/D converter 22 is configured to operate at a slower update rate, in which less power is consumed, then A/D bias circuit 24 is configured to decrease the amount of power A/D converter 22 draws from the power supply.

Controller 26 provides mode selection instructions to clock 28 to control the frequency of clock 28. The frequency generated by clock 28 determines the speed with which a number of components within mode selectable field transmitter 10 operate, such as signal processor 30 and A/D converter 22. For example, a higher clock frequency allows signal processor 30 to increase the number of instructions processed or A/D converter 22 to operate at an increased update rate. A higher clock frequency may therefore be used to allow signal processor 30 to run more complex signal conditioning algorithms to improve the accuracy of sensed process variables, or may allow microprocessor to process data at a higher overall pace to allow for higher update rates. As described above with respect to A/D converter 22, a higher clock frequency may also be used to increase the update rate of A/D converter 22. However, the trade-off associated with higher clock frequencies is increased power consumption by selectable mode transmitter 10.

In addition to affecting performance of signal processor 30 by modifying the clock frequency, performance of signal processor 30 can also be modified by altering the algorithms it executes. Controller 26 may instruct signal processor 30 to execute a particular signal compensation algorithm, or may communicate a new or modified algorithm to signal processor 30. The signal compensation algorithm executed by signal processor 30 affects the accuracy of the signal compensation provided by signal processor 30. Typically, a signal compensation algorithm takes into account individual characteristics of sensor 20 and current operating parameters, such as temperature, to provide signal compensation. Complex algorithms may be used to provide better (i.e., more accurate) signal compensation. More complex signal compensation algorithms require additional computing (i.e., execution of more instructions) by signal processor 30, and therefore requires additional power (or some other tradeoff, such as reduced update rates).

Controller 26 also provides mode selection instructions to LOI 32. Control of LOI 32 may be as simple as turning LOI 32 "on" or "off." In other embodiments, LOI 32 may include a variety of additional functions. For instance, LOI 32 may include an LCD screen that provides advanced functionality, such as graphing capabilities or a user interface. Additional functionality typically requires additional power requirements. Therefore, based on the selected mode of operation, controller 26 controls which features or functions of LOI 32 are made available. For example, to conserve power, controller 26 may turn off a number of the advanced features provided by LOI 32.

Finally, based on the selected mode of operation, controller 26 controls how data is communicated to control room 14. Controller 26 provides mode selection instructions to digital communications circuit 34 and D/A converter 36. Oftentimes, digital communication is employed only intermittently (e.g., every six months). In this case, controller 26 may conserve power by selectively controlling whether digital communication circuit 34 is "on" or "off." In addition, controller 26 may provide mode selection instructions regarding how digital communication circuit operates. For example, digital communication circuit 34 may be configured to operate in a high signal mode in which the strength of the digital signal generated by digital communication circuit 34 is increased. This may be beneficial if mode selectable field transmitter 10 is operating in electronically noisy conditions.

Controller 26 may also provide mode selection instructions to D/A converter 36 to affect analog communications of mode selectable field transmitter 10. In one embodiment, the response time of D/A converter 36 is selectable configured. The response time of D/A converter 36 defines the amount of time D/A converter 36 takes to respond to a changing input variable. A fast responding D/A converter 36 may be beneficial in applications in which the update rate of A/D converter 22 is increased. However, by increasing the response time of D/A converter 36, the amount of power consumed by D/A converter 36 increases, and the amount of output noise generated by D/A converter 36 increases. Conversely, power consumption is reduced by decreasing the response time of D/A converter 36.

Therefore, in the embodiment shown in FIG. 2, controller 26 provides mode selection instructions to one or more of the connected components in order to implement a desired mode of operation.

Communication of a selected mode of operation to mode selectable field transmitter 10 (and therefore, to controller 26) may implemented in a variety of ways. In one embodiment, the desired mode of operation is loaded onto memory device 38, which may be implemented with Electronically Erasable Programmable Read Only Memory (EEPROM). Controller 30 accesses memory device 38 and provides control signals to each of the necessary components to implement the desired mode of operation. This type of mode selectable field transmitter would typically be programmed only once, and would be programmed to meet the needs of a specific application. For instance, a customer may order a field transmitter with specific operational requirements. A manufacturer or distributor would program memory device 38 with the mode of operation that meets the operational requirements provided by the customer. The benefit of this approach is that a single field transmitter may be easily programmed by a manufacturer or supplier to meet the needs of a particular application.

In another embodiment, mode selectable transmitter 10 is capable of being switched between different modes of operation while in service. For instance, in one embodiment, mode selection is digitally communicated from control room 14 to controller 26 using the digital communication capabilities of mode selectable field transmitter 10. The digital communication may include the necessary information for controller 26 to implement the desired mode of operation, or may provide identification of the desired mode of operation stored within memory device 38. Based on a received digital communication indicating the desired mode of operation, controller 26 provides mode selection instructions to the necessary components.

In other embodiments, a user communicates the desired mode of operation using LOI 32, or physical switches connected to provide mode selection data to controller 26. Based on instructions received locally from LOI 32 or from physical switches, controller 26 provides mode selection instructions to the necessary components.

In another embodiment, mode selectable field transmitter 10 makes mode selection decisions automatically based in part on any detectable excess or unused power. Field transmitter 10 may be designed to consume less power than specified based on safe design margins to account for manufacturing variances and operating conditions. The net result is that field transmitter 10 may operate under conservative estimates of the power available to field transmitter 10 and the power consumed by different functions of field transmitter 10. By detecting excess or unused power, field transmitter 10 can select an operating mode to take advantage of the excess or unused power.

In one embodiment, mode selectable field transmitter 10 measures the quiescent current (i.e., the current presently consumed by field transmitter 10) using current measuring device 39 and provides the measured quiescent current to controller 26. Based on the measured quiescent current used by field transmitter 10, any unused current may be allocated to various components within mode selectable field transmitter 10.

In addition, the quiescent current will typically vary depending on the operating temperature of field transmitter 10. Therefore, information regarding the operating temperature of field transmitter 10 may be used in conjunction with quiescent current measurements to determine the power requirements of field transmitter 10, as well as whether any excess or unused current is available to field transmitter 10. In one embodiment, the quiescent current and operating temperature are measured at start-up. Based on known relationships between quiescent current and operating temperature, current operating requirements of field transmitter 10 may be derived, and the presence of any excess or unused current can be determined. In another embodiment, the quiescent current and operating temperature are measured continuously, wherein excess or unused current determinations are made based on both the quiescent current and the operating temperature. Based on determinations of excess or unused current, controller 26 may provide mode selection instructions to various components to take advantage or utilize any excess or unused power.

EXAMPLE MODES OF OPERATION

The following examples are used to illustrate possible modes of application of mode selectable field transmitter 10. The following examples are not meant to be exhaustive, but merely illustrative of the variety of different operating modes available to mode selectable field transmitter 10.

Universal Mode

Performance of selectable mode transmitter operating in universal mode provides good overall performance. Power is allocated to individual components to provide good updates rates, good signal compensation, and at least some LOI operations. This mode of operation is likely to meet a wide range of applications.

Fast Response Mode

As compared to the universal mode, the fast response mode provides faster update rates. This mode of operation may be useful in applications in which the sensed process variable may vary rapidly with time.

The fast response mode of operation may be implemented in a number of ways. In one embodiment, the fast response mode of operation is implemented by configuring the internal rate of A/D converter 22 to increase the update rate at which data is provided to controller 26. Controller 26 may increase the internal update rate of A/D converter 22 directly, or may configure clock 28 to provide an increased or higher frequency clock signal to A/D converter 22. The increase in update rates provided by A/D converter 22 will typically result in an increase in power allocation to A/D converter 22. To increase the power allocated or drawn by A/D converter 22, controller 26 configures A/D bias circuit 24 to provide or allow A/D converter 22 to draw additional power from the power supply (now shown).

The increase in power allocated to these components results in a decrease of power being made available for other functions. For instance, in the fast response mode, power may be decreased to components like LOI 32 or digital communication circuit 34. The reduction of power to LOI 32 results in a decrease in functionality provided by LOI 32. Digital communication circuit 34 may be selectively turned "on" and "off", as required, to reserve power. In addition, power provided to digital communication circuit 34 may be conserved at the expense of the associated reliability of signals provided/received by digital communication circuit 34.

In addition, power consumed by signal processor 30 may be reduced by selecting a less complex signal compensation algorithm, at the expense of accuracy provided by the signal compensation algorithm.

Therefore, in one embodiment the fast response mode allocates additional power to A/D converter 22 and A/D bias 24 to provide increased update rates. The increase of power allocated to these components is based on a reduction of power provided to one or more of the other connected components. Therefore, there may be many sub-modes of operations to select from within the fast response mode. For instance, fast response mode may be implemented by re-allocating power previously consumed by LOI 32. In another embodiment, power is re-allocated in part from LOI 32, and in part from a decrease in signal compensation provided by signal processor 30 (resulting in a decrease of power consumed by signal processor 30).

In another embodiment, the fast response mode is implemented not by re-allocating power to A/D converter 22, but by configuring A/D converter 22 to provide faster update rates at the expense of accuracy provided by A/D converter 22. That is, controller 26 configures A/D converter 22 to form updates based on less internal A/D converter data than would be used in the universal mode. This allows the update rate of A/D converter 22 to be increased without having to allocate additional power to A/D converter 22.

Fast Start Mode

The fast start mode measures and communicates a first measured variable as quickly as possible following start-up of field transmitter 10. Fast start mode may be useful in several applications. For instance, in one application field transmitter 10 is a wireless device (battery operated) that measures process variables at a reduced rate (e.g., data measured once per second). To conserve battery power, field transmitter 10 may power down or "sleep" between measurements. In this application, by reducing the amount of time following start-up required to measure and communicate the process variable, the overall amount of power required to measure and communicate the process variable is reduced, resulting in conservation of battery life.

In another application, it may be critical to measure and communicate the process variable as quickly as possible following start-up of field transmitter 10. In this embodiment, a two-step initialization process is employed in which the fast start mode is employed to measure and communicate the process variable at an increased rate upon start-up, and then standard or full initialization of field transmitter 10 is employed after the fast start mode to make subsequent measurements of process variables.

Similar to the fast response mode, in the fast start mode controller 26 configures A/D converter 22 to operate at a higher update rate. In addition, controller 26 may configure clock 28 to operate at a higher frequency. Because only the first measurement or update is being made at the increased update rate or clock frequency, both the update rate and clock frequency may be run at speeds that would be otherwise unsustainable over longer periods of time.

Operating in fast start mode (in either of the embodiments described above) requires the allocation of power to components such as A/D converter 22. Because the fast start mode is typically only implemented for a short amount of time following start-up of field transmitter 10, the available power can initially be distributed to the necessary components such as A/D converter 22 and signal processor 30 to provide a fast, initial measurement of the process variable. After the first initial measurement is made, power may be reallocated to other components with field transmitter 10 such as LOI 32 and digital communication circuit 34.

High Performance Signal Compensation Mode

As compared to the universal mode, the high performance signal compensation mode provides the most accurate data signal possible. Signal compensation accounts for individual sensor characteristics that affect the accuracy of the sensed process variable. The accuracy of data processed by signal processor 30 is dependent on the complexity of the signal compensation algorithm. To provide a more accurate data signal, signal processor 30 makes use of more complex signal compensation algorithms that increases the number of instructions (and therefore processing time) executed by signal processor 30. This mode of operation may be useful in applications in which the accuracy of the sensed process variable is of the utmost importance.

In one embodiment, the increase in processing time required for the more complex signal compensation algorithm is accompanied by a decrease in the update rate. The decrease in the update rate allows signal processor 30 the necessary time to process each measured process variable using the more complex signal compensation algorithm. In another embodiment, the update rate remains unchanged, but the frequency of clock 28 is increased such that signal processor 30 is able to execute additional instructions required in the more complex signal compensation algorithm without having to reduce the update rate. The increase in the frequency at which signal processor 30 operates increases the power consumed by signal processor 30. As discussed above, the increase allocation of power to signal processor 30 must be accompanied by a decrease in power allocation elsewhere.

Advanced LOI Mode

In the advanced LOI mode of operation, additional power is allocated to LOI 32 in order to provide additional, or more complex, functionality. For example, additional functionality provided by LOI 32 may include functions such as graphing of acquired measured process variables. To provide the additional functionality provided in the advanced LOI mode, additional power is allocated to LOI 32. To accommodate the additional power provided to LOI 32, power is decreased to other components within field transmitter 10. For example, the re-allocation of power to LOI 32 may come at the expense of update rates or signal compensation.

On-Demand LOI Mode

The on-demand LOI mode is power conversation feature that may be used in conjunction with any of the other listed modes of operation. The on-demand LOI mode maintains LOI 32 in a sleep mode in which no or very little power is allocated to LOI 32. Upon request, power is temporarily supplied to LOI 32 for a short amount of time (e.g., 30 seconds) to allow a user to view or interact with field transmitter 10 via LOI 32. This requires controller 26 to re-allocate power temporarily within field device 10 to compensate for the temporary increase in power provided to LOI 32. This re-allocation of power may result in temporary slowing of update rates or temporary reduction in the accuracy of signal compensation provided by signal processor 30. The benefit of this mode of operation, is the ability to provide increased functionality or performance of field transmitter 10 during the period in which LOI 32 is in sleep mode.

High Speed Analog Mode

In the high speed analog mode, additional power is allocated to D/A converter 36, such that the response rate (i.e., the rate at which D/A converter 36 responds to changes in measured process variables) is increased. In one embodiment, additional power allocated to implement the high speed analog mode is provided by operating digital communication circuit 34 in a sleep mode in which little or no power is allocated to digital communication circuit 34. This mode may be beneficial in applications in which process variables change rapidly, and additional power has already been allocated to increase update rates associated with A/D converter 22.

Operating digital communication circuit 34 in sleep mode allows power to be reallocated to other components within field transmitter 10. In addition, digital communication circuit 34 is able to monitor the loop current for digital communications while in sleep mode. If digital activity is detected, then digital communication circuit 34 is switched to an operational mode and power is re-allocated to digital communication circuit 34.

High Signal Mode

As compared to the universal mode, the high signal mode provides an improved digital communication signal. This mode of operation may be useful in applications in which field transmitter 10 is operating in a electronically "noisy" condition that might otherwise prevent field transmitter 10 from communicating digital information. Once again, additional power allocated to digital communication circuit 34 means that power is reduced to one of the other components within field transmitter 10.

Half Power Mode

Figure 3:
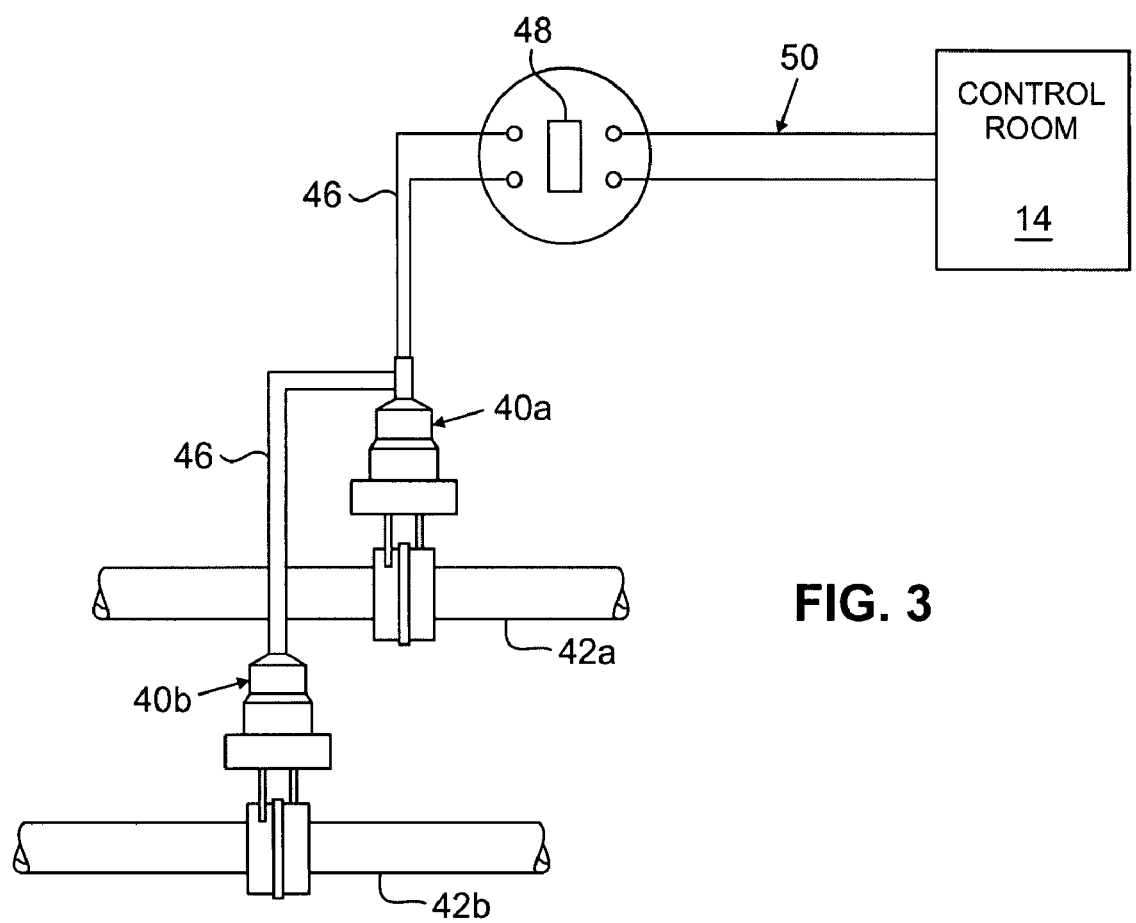
FIG. 3 is a perspective view of a pair of mode selectable transmitters connected to a feature board to provide sensed process data to a control room.

This mode of operation is useful in distributed field device architectures, such as the distributed architecture shown in FIG. 3. In the configuration shown in FIG. 3, two mode selectable field transmitters 40a and 40b are connected to monitor process variable data in pipes 42a and 42b, respectively. Mode selectable field transmitters 40a and 40b may be essentially identical to field transmitter 10, described with respect to FIGS. 1 and 2, except that instead of communicating with control room 14 using analog or digital means, mode selectable field transmitters 40a and 40b communicate data to feature board 48 using controller area network (CAN) bus 46. Feature board 48 then communicates data provided by mode selectable field transmitters 40a and 40b to control room 14 via typical analog or digital communication using twisted wire pair 50.

In a distributed application such as the one shown in FIG. 3, mode selectable transmitters 40a and 40b must share the power provided by control room 14. Thus, the half power mode allows mode selectable transmitters 40a and 40b to be configured to operate on half as much power as would otherwise be allocated to a single or standalone field transmitter (such as mode selectable field transmitter 10 shown in FIG. 1).

Typically, in distributed architectures like the one shown in FIG. 3, field transmitters are designed to operate in a distributed system in which power is limited. The ability to operate in half power mode allows a generic field transmitter, such as mode selectable field transmitters 40a and 40b, to be used in a distributed environment. In half power mode, each mode selectable field transmitter 40a and 40b is constrained to operating on half of the power as would otherwise be allocated to a single or standalone field transmitter. The power provided to each mode selectable field transmitter 40a and 40b may be distributed within each field transmitter as desired.

Although the present invention has been described with reference to preferred embodiments, workers skilled in the art will recognize that changes may be made in form and detail without departing from the spirit and scope of the invention.

The invention claimed is:

1. A mode selectable field transmitter comprising:
   a housing;
   a sensor that generates an electrical signal representative of a sensed process variable;
   transmitter circuitry located within the housing that transmits an output to a receiver external to the housing based on the electrical signal provided by the sensor, wherein the transmitter circuitry is configurable to a plurality of active operating modes having different combinations of function, performance, and power consumption; and
   wherein the transmitter circuitry includes a controller that electrically configures the transmitter circuitry to one of the plurality of operating modes in response to mode selection data received from a source external to the housing.

2. The mode selectable transmitter of claim 1, wherein the transmitter circuitry includes:
   an analog-to-digital (A/D) converter that converts the electrical signals provided by the sensor to digital signals, wherein the A/D converter is electrically configurable by the controller to operate at a selected update rate.

3. The mode selectable transmitter of claim 2, wherein the transmitter circuitry includes:
   an A/D bias circuit connected to regulate power provided to the A/D converter, wherein the A/D bias circuit is electrically configurable by the controller to regulate the power provided to the A/D converter to a selected amount.

4. The mode selectable field transmitter of claim 1, wherein the transmitter circuitry includes:
   a signal processor that provides signal compensation in response to the electrical signal provided by the sensor, wherein the signal processor is electrically configurable by the controller to execute a selected signal compensation algorithm.

5. The mode selectable field transmitter of claim 1, wherein the transmitter circuitry includes:
   a clock for generating a timing signal that is provided to components within the transmitter circuitry, wherein the clock is electrically configurable by the controller to provide the timing signal at a selected frequency.

6. The mode selectable field transmitter of claim 1, wherein the transmitter circuitry includes:
a local operator interface (LOI) that provides a graphical display for displaying data, wherein the LOI is electrically configurable by the controller to provide a selected level of functionality.

7. The mode selectable field transmitter of claim 1, wherein the transmitter circuitry includes:
a digital communication circuit that provides digital communication signals between the mode selectable transmitter and the external receiver, wherein the digital communication circuit is electrically configurable by the controller to generate digital communication signals at a selected signal strength.

8. The mode selectable field transmitter of claim 1, wherein the transmitter circuitry includes:
a digital communication circuit that provides digital communication signals between the mode selectable transmitter and the external receiver, wherein the digital communication circuit is electrically configurable by the controller to operate in either a sleep mode or an active mode.

9. The mode selectable field transmitter of claim 1, wherein the transmitter circuitry includes:
a digital to analog (D/A) converter that generates the output that is transmitted to the external receiver based on the electrical signal provided by the sensor, wherein the D/A converter is electrically configurable by the controller to operate at a selected response rate.

10. The mode selectable field transmitter of claim 1, wherein the transmitter circuitry includes:
memory for storing the mode selection data received from the source external to the transmitter, wherein the controller accesses the mode selection data in the memory and electrically configures the transmitter circuitry based on the stored mode selection data.

11. The mode selectable field transmitter of claim 1, wherein the transmitter circuitry includes:
memory for storing mode selection data corresponding to a plurality of operating modes; and
wherein the controller receives the mode selection command from the source external to the transmitter identifying a selected mode of operation, wherein the controller accesses the mode selection data corresponding to the selected mode of operation and configures the transmitter circuitry based on the selected mode selection data.

12. The mode selectable field transmitter of claim 1, wherein the transmitter circuitry includes:
a current measuring circuit that monitors current usage of the transmitter circuitry and provides the monitored current usage to the controller, wherein the controller configures the transmitter circuitry based on the monitored current usage.

13. A mode selectable field transmitter comprising:
a sensor that generates an electrical signal in response to a sensed process variable;
a plurality of components connected to transmit an output signal in response to the electrical signal generated by the sensor, wherein at least one of the plurality of components is configurable to provide different active modes of operation, each active mode of operation providing a different combination of function, performance, and power consumption for the mode selectable field transmitter;
a memory for storing mode configuration data received from an external source corresponding to a selected mode of operation; and
a controller for electrically configuring the at least one configurable component based on the mode configuration data stored in the memory.

14. The mode selectable transmitter of claim 13, wherein the plurality of components include:
an analog-to-digital (A/D) converter that converts the electrical signal provided by the sensor to a digital signal, wherein the A/D converter is electrically configurable by the controller to generate the digital signal at an update rate based on the selected mode of operation.

15. The mode selectable field transmitter of claim 13, wherein the plurality of components include:
a signal processor that provides signal compensation to a signal received in response to the sensed process variable, wherein the signal processor is electrically configurable by the controller to provide a level of signal compensation based on the selected mode of operation.

16. The mode selectable field transmitter of claim 13, wherein the plurality of components include:
a clock that generates a timing signal that is provided to one or more of a plurality of components, wherein the clock is electrically configurable by the controller to generate the timing signal at a frequency based on the selected mode of operation.

17. The mode selectable field transmitter of claim 13, wherein the plurality of components include:
a local operator interface (LOI) for displaying data, wherein the LOI is electrically configurable by the controller to provide a level of functionality based on the selected mode of operation.

18. The mode selectable field transmitter of claim 13, wherein the plurality of components include:
a digital communication circuit for generating a digital signal that is communicated from the mode selectable field transmitter to an external receiver, wherein the digital communication circuit is electrically configurable by the controller to generate the digital signal at a selected signal strength based on the selected mode of operation.

19. The mode selectable field transmitter of claim 13, wherein the plurality of components include:
a digital communication circuit for providing digital communication between the mode selectable field transmitter and a receiver external to the mode selectable field transmitter, wherein the digital communication circuit is electrically configurable by the controller to operate in a sleep mode until the digital communication circuit receives a request to provide digital communications.

20. The mode selectable field transmitter of claim 13, wherein the plurality of components include:
a digital to analog (D/A) converter for converting a digital signal representing the sensed process variable to an analog representation, wherein the D/A converter is electrically configurable by the controller to convert the digital signal to the analog representation at a response rate based on the selected mode of operation.

21. A method of configuring a mode selectable field transmitter based on a selected mode of operation, the method comprising:
receiving mode selection data from a source external to the mode selectable transmitter; and
electrically configuring transmitter circuitry within the mode selectable field transmitter based on the received mode selection data to implement one of a plurality of active operating modes, each operating mode providing a different combination of function, performance, and power allocation, wherein the electrical configuring of the transmitter circuitry is performed by a controller.

22. The method of claim 21, wherein electrically configuring the transmitter circuitry based on a fast response mode of operation includes:
    allocating additional power to an analog-to-digital (A/D) converter by electrically configuring the A/D converter to operate at an increased update rate.

23. The method of claim 21, wherein configuring the transmitter circuitry based on a fast start mode of operation includes:
    allocating additional power to an analog-to-digital (A/D) converter by electrically configuring the A/D converter to acquire a first sensed process variable at an increased update rate; and
    re-allocating power from the A/D converter to other components within the transmitter circuitry after the first sensed process variable is acquired.

24. The method of claim 21, wherein configuring the transmitter circuitry based on a high performance signal compensation mode of operation includes:
    allocating additional power to a signal processor to execute a more complex signal processing algorithm to provide improved signal compensation.

25. The method of claim 24, wherein configuring the transmitter circuitry based on the high performance signal compensation mode of operation further includes:
    electrically configuring a clock to provide a clock signal having an increased frequency to the signal processor.

26. The method of claim 21, wherein configuring the transmitter circuitry based on an advanced local operator interface (LOI) mode of operation includes:
    allocating additional power to a local operator interface by electrically configuring the LOI to provide additional functionality.

27. The method of claim 21, wherein configuring the transmitter circuitry based on an on-demand local operator interface (LOI) mode of operation includes:
    operating a local operator interface (LOI) in a sleep mode until receiving a request for operation; and
    allocating power to the LOI for a set amount of time following the request for operation by electrically configuring the LOI to operate in a non-sleep mode.

28. The method of claim 21, wherein configuring the transmitter circuitry based on a high speed analog mode of operation includes:
    allocating additional power to a digital-to-analog (D/A) converter by electrically configuring the D/A converter to operate at an increased response rate.

29. The method of claim 21, wherein configuring the transmitter circuitry based on a high signal mode of operation includes:
    allocating additional power to a digital communication circuit by electrically configuring the digital communication circuit to provide digital communication signals at an increased signal strength.

30. The method of claim 21, wherein configuring the transmitter circuitry based on a half power mode of operation includes:
    allocating power between the transmitter circuitry based on an overall reduction in total power available to the mode selectable field transmitter.

* * * * *

UNITED STATES PATENT AND TRADEMARK OFFICE
CERTIFICATE OF CORRECTION

| | | |
|---|---|---|
| PATENT NO. | : 7,808,379 B2 | Page 1 of 1 |
| APPLICATION NO. | : 11/714639 | |
| DATED | : October 5, 2010 | |
| INVENTOR(S) | : Robert C. Hedtke, John Paul Schulte and Steven Richard Trimble | |

It is certified that error appears in the above-identified patent and that said Letters Patent is hereby corrected as shown below:

Col. 12, Line 30
  Delete "LOT"
  Insert --LOI--

Signed and Sealed this
Eighteenth Day of October, 2011

David J. Kappos
*Director of the United States Patent and Trademark Office*